G. A. LUTZ & C. C. SIBLEY.
OUTLET OR JUNCTION BOX.
APPLICATION FILED NOV. 29, 1905.
929,097.
Patented July 27, 1909.
2 SHEETS—SHEET 1.
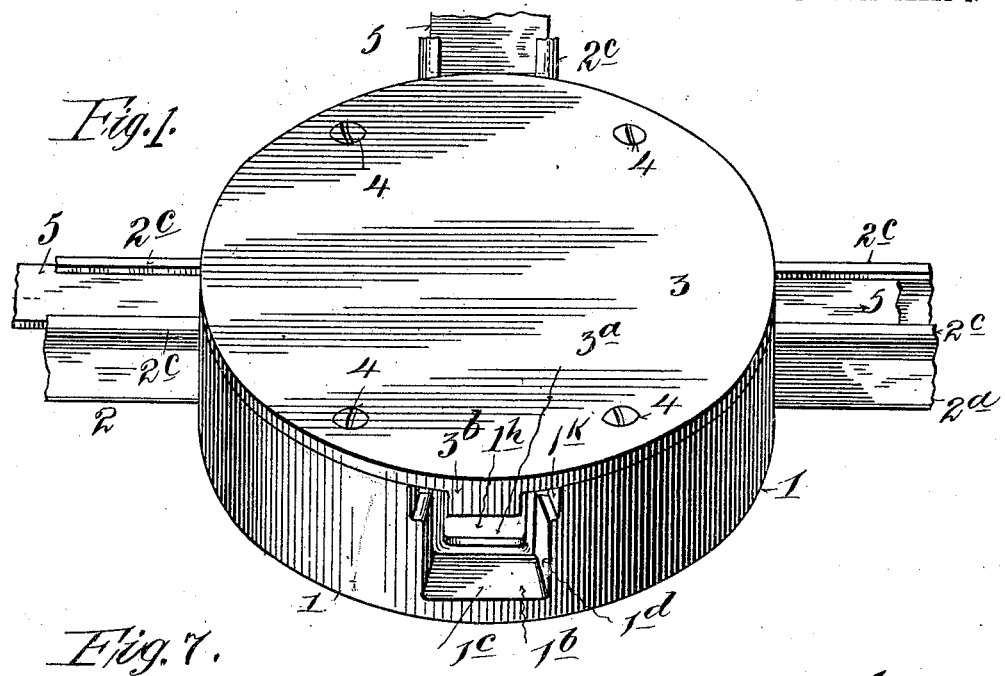
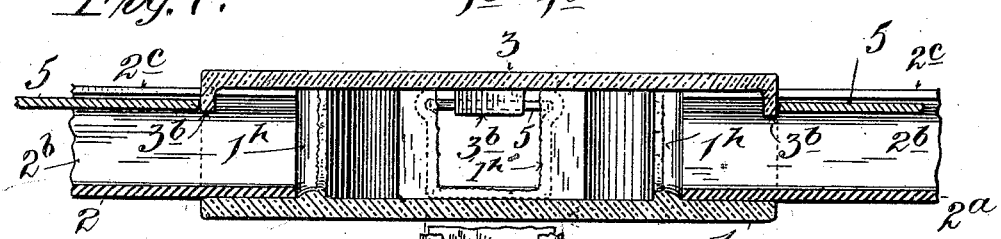
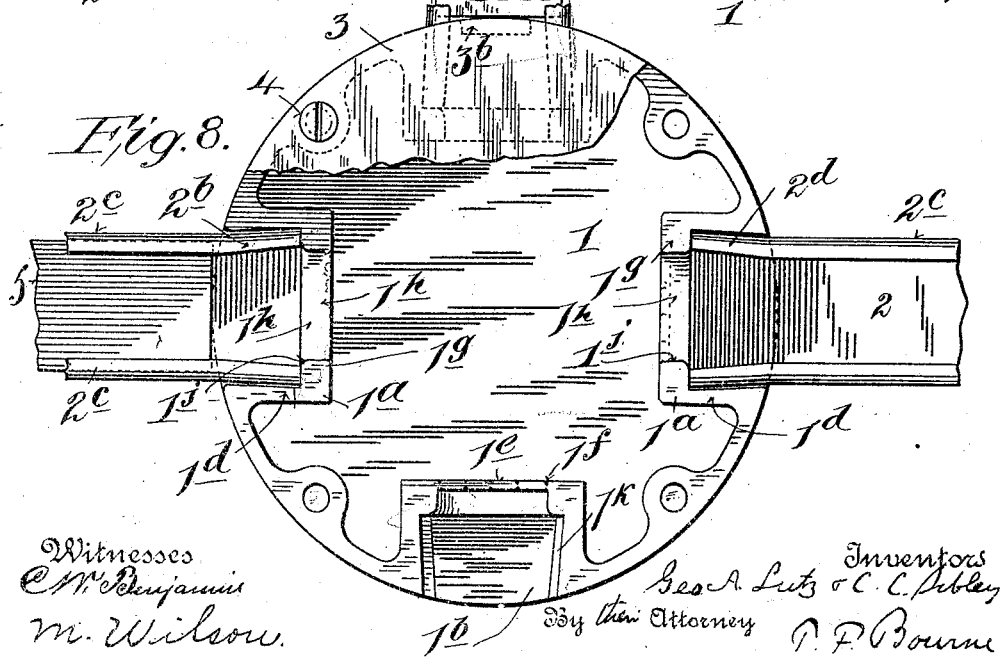
Witnesses
C. W. Benjamin
M. Wilson
Inventors
Geo. A. Lutz & C. C. Sibley
By their Attorney
P. F. Bourne

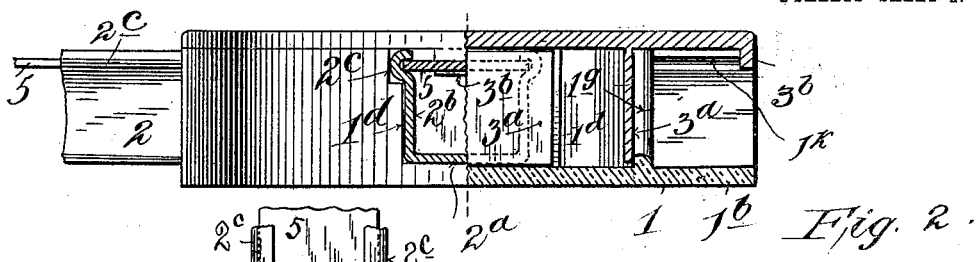
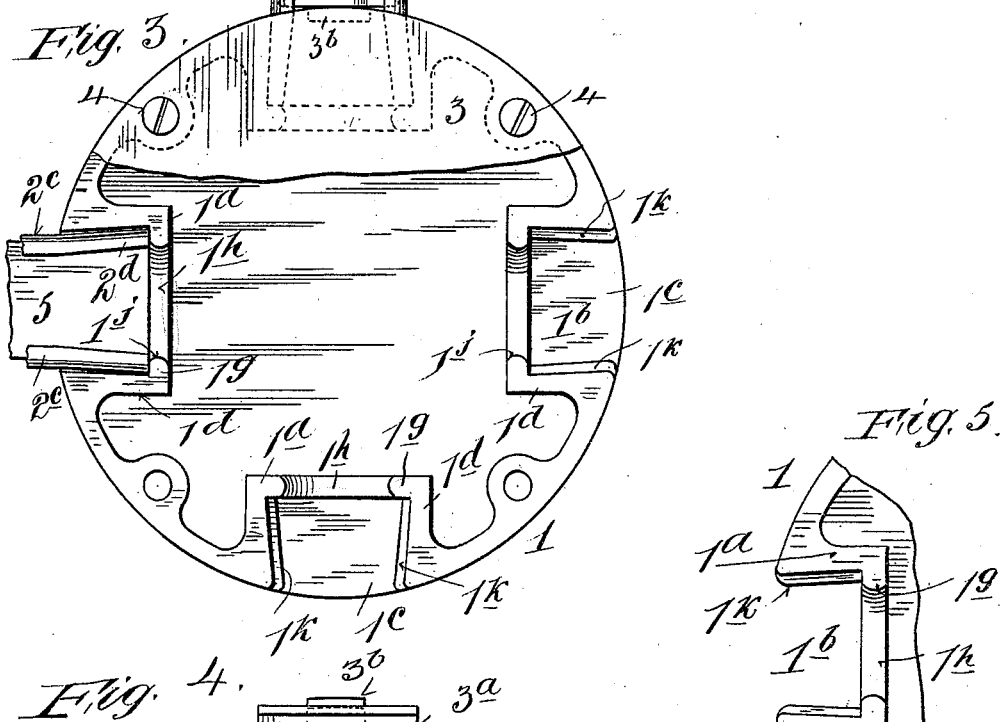
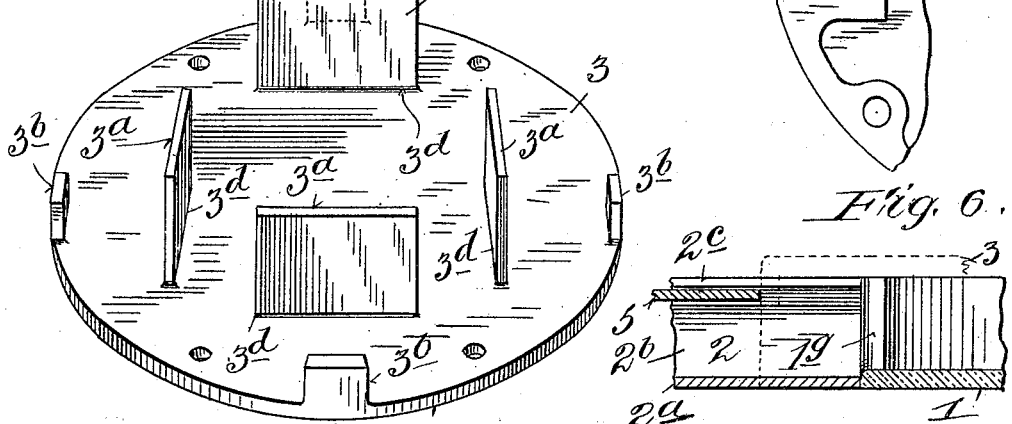

UNITED STATES PATENT OFFICE.

GEORGE A. LUTZ, OF NEW YORK, N. Y., AND CLARENCE C. SIBLEY, OF PERTH AMBOY, NEW JERSEY.

OUTLET OR JUNCTION BOX.

No. 929,097. Specification of Letters Patent. Patented July 27, 1909.

Application filed November 29, 1905. Serial No. 289,560.

*To all whom it may concern:*

Be it known that we, GEORGE A. LUTZ and CLARENCE C. SIBLEY, citizens of the United States, residing, respectively, in New York city, borough of Brooklyn, New York, and Perth Amboy, Middlesex county, New Jersey, have invented certain new and useful Improvements in Outlet or Junction Boxes, of which the following is a specification.

This invention relates to improvements in outlet or junction boxes, and particularly those adapted for connection with the class of conduits that are made in channel-like form having one side open and provided with removable covers.

The object of the invention is to provide improved means for connecting the conduits with the box and for maintaining the side walls of the box closed at the places where the conduits are to be attached until the conduits are connected therewith.

The invention comprises the novel arrangement of parts that will be more fully hereinafter set forth and then pointed out in the claims.

Reference is to be had to the accompanying drawings forming part hereof, wherein, Figure 1 is a perspective view of an outlet or junction box embodying this invention, Fig. 2 is a side view, partly in section, of the box and connected conduits, Fig. 3 is a plan view of the box, part of the cover being removed, Fig. 4 is an inverted plan view of the cover, Fig. 5 is a detail view of a modification, Fig. 6 is a section thereof, showing a conduit applied thereto, Fig. 7 is a central section of the box and conduits illustrating a modification, and Fig. 8 is a plan view of Fig. 7, part of the cover being removed.

Similar numerals of reference indicate corresponding parts in the several views.

In the drawings the numeral 1 indicates a box adapted to be connected to conduits 2, and at 3 is a removable cover for the box which may be held to the latter by screws 4. Within the box 1 are outlets or coupling members $1^a$ for connection with the ends of the conduits 2, which members are shown projecting inwardly from the side wall of the box. The members $1^a$ have socket portions $1^b$ that open through the wall of the box and have open tops which are closed by the cover 3, the bottom and side walls $1^c$, $1^d$ of the members $1^a$ at the sockets $1^b$ preferably conforming in contour substantially to the contour of the conduits 2. The inner or back walls $1^g$ of the members $1^a$ form abutments for the ends of the conduits 2 to limit the extent of movement of the conduits into the box, the openings $1^h$ in the walls $1^g$ permitting the passage of conductors when said walls are unobstructed. By preference, the edges $1^j$ of the walls $1^g$ are rounded at the openings $1^h$ to prevent abrasion of insulation on conductors when the latter are drawn through the conduits into or from box 1. The upper surfaces of the members $1^a$ and the wall of box 1 are made flush so that when cover 3 is secured on the box it will close the upper parts of the sockets $1^b$ of the members $1^a$.

Means are provided for closing the openings $1^h$ that lead from the sockets $1^b$ into the box, and to this end in Figs. 1 to 6 the cover 3 is shown provided with depending flanges or walls $3^a$ adapted to fit against the walls $1^g$ to close the openings $1^h$ (see Fig. 2) when the conduits 2 are not applied to the socket members $1^a$, but said flanges $3^a$ are adapted to be knocked out or broken away when conduits are attached to the box. The cover and its flanges $3^a$ will wholly close the sockets $1^b$ and the openings $1^h$ when the cover is upon the box until conduits are applied thereto. The closures $3^a$ for the openings $1^h$ by being attached to or made integral with the cover 3 may be readily knocked away when the cover is removed and smooth edges $1^j$ at the sides of the opening $1^h$ may be assured. The metal may be weakened at $3^d$ to permit ready knocking out of the flanges $3^a$. If preferred, however, the closures for the openings $1^h$ may be provided by means of walls $1^e$ cast integral with the walls $1^g$, as shown in Figs. 7 and 8, the walls $1^e$ being shown located at the inner ends of the members $1^a$, and the walls $1^e$ may be weakened by indentations $1^f$ so that the walls $1^e$ may be readily knocked out to permit the passage into the box of the conductors from the conduits. In this form of the invention, when the cover 3 is upon the box said cover and the walls $1^e$ keep the sockets $1^b$ closed until the walls $1^e$ are knocked away and the conduits are applied.

The conduits 2 shown in the drawings have bottom and side walls $2^a$, $2^b$ provided with longitudinally extending projecting portions $2^c$, which may be in the form of opposed grooves, receiving the detachable or sliding covers 5. To form a stop for the covers 5 and to limit their inward movement into box 1 the cover 3 is shown provided with lugs 3$^b$ that project toward or into the sockets 1$^b$ in line with the covers 5 whereby said covers may abut against said lugs or stops. As a convenient means for holding the conduits 2 from longitudinal movement with respect to box 1 the side walls 1$^d$ of the members 1$^a$ are provided with off-set channel or grooved portions 1$^k$ that flare or converge in an outward direction and receive the outwardly bent flaring or diverging end portions 2$^d$ of the projections 2$^c$ of the conduits. Thus, when the end portions of the conduits are in the sockets 1$^b$ and the flaring portions 2$^d$ of the conduits are in the converging or flaring channels 1$^k$ and the cover 3 is held upon the box, the conduit will be firmly held in connection with the box to keep the box and the conduits from separation.

In Figs. 5 and 6 the sockets 1$^b$ have no bottom walls 1$^c$ and the botttoms 2$^a$ of the conduits 2 may rest flush with the bottom of box 1, the conduits being held upon the box by the flaring channels 1$^k$ and the parts 2$^d$ of the conduits. By this means the thickness of the box can be reduced by an amount equal to the thickness of the bottom walls 1$^c$.

The box 1 and its socket members will preferably be made in a single piece of cast metal so as to avoid joints and provide tight closures at the sockets 1$^b$.

To attach a conduit to the box the cover 3 is removed and a flange 3$^a$, or the wall 1$^e$ of one of the socket members 1$^a$, is broken away, then the end of the conduit 2 is placed in the corresponding socket 1$^b$ so that the channels 1$^k$ will receive and register with the flaring portions 2$^d$ of the conduit, the cover 3 is secured upon the box, and the cover 5 is applied to the conduit and pushed against the lugs 3$^b$, whereby the end of the conduit is inclosed by the parts of the box and its cover. The conductors from the conduit can be run through the box in well known manner.

While the box 1 is shown provided with four outlets or sockets it will be understood that the box may be provided with any desired number of such outlets or sockets arranged in line or at any desired angle with respect to each other.

The invention is not limited to the particular details of construction shown and described as they may be varied without departing from the spirit thereof.

Having now described our invention what we claim is:

1. An outlet or junction box having a plurality of socket members having open tops and ends and extending inwardly from the wall of the box adapted to receive conduits, and a cover for the box.

2. An outlet or junction box having a plurality of internally disposed socket members, said members having their upper portions open to receive conduits, and a cover for the box adapted to close the open portions of the socket members.

3. An outlet or junction box having a plurality of socket members extending inwardly from the wall of the box and provided with open end and top portions, a cover for the box adapted to close the open top portions of the socket members, and breakable closures for the end openings of said socket members.

4. An outlet or junction box having a plurality of socket members extending inwardly from the wall of the box and having an open top and an inner wall provided with an open portion, a cover for the box adapted to close the top openings of said members, and a breakable closure for the end openings of the socket members.

5. An outlet or junction box having a plurality of socket members extending inwardly from the wall of the box and having an open top and an inner wall provided with an open portion, a cover for the box adapted to close the top openings of said members, and a breakable closure for the end openings of the socket members, the cover having lugs to project into the socket members.

6. An outlet or junction box having socket members extending inwardly from the inner wall of the box to receive conduits and having open tops and ends, and a cover having breakable flanges to close the passage into the box through the socket members.

7. An outlet or junction box having socket members to receive conduits, and a cover having breakable flanges to close the passage into the box through the socket members, the cover also having lugs projecting toward the socket members, and in line with said breakable flanges, combined with conduits having movable covers alined with said lugs.

8. An outlet or junction box having socket members provided with walls, said walls having off-set channels adapted to receive extensions or conduits.

9. An outlet or junction box having socket members provided with walls, said walls having off-set channels adapted to receive extensions on conduits, said channels converging toward the periphery of the box.

10. An outlet or junction box having socket members integral with the box wall and provided with side walls extending inwardly from the wall of the box and converging outwardly, and non-breakable abutments at the inner portion of said walls to limit the inward movement of conduits, and a cover for the box.

11. An outlet or junction box having angular socket members integral with the box wall and provided with side walls extending inwardly from the wall of the box and converging outwardly, and abutments at the inner portion of said walls to limit the inward movement of conduits, a cover for the box, and breakable closures for said socket members.

12. An outlet or junction box having socket members integral with the box wall and provided with side walls extending inwardly from the wall of the box and converging outwardly and abutments at the inner portion of said walls to limit the inward movement of conduits, a cover for the box, said cover having flanges depending into the box to close the socket members.

13. An outlet or junction box having socket members provided with side walls extending inwardly from the wall of the box and abutments at the inner portion of said walls to limit the inward movement of conduits, a cover for the box, said cover having flanges depending into the box to close the socket members, the cover also having lugs extending into the socket members.

14. An outlet or junction box having socket members provided with side walls extending inwardly from the wall of the box and abutments at the inner portion of said walls to limit the inward movement of conduits, said side walls having channels to receive extensions on conduits.

15. An outlet or junction box having socket members provided with side walls extending inwardly from the wall of the box and abutments at the inner portions of said walls to limit the inward movement of conduits, said side walls having channels, said channels converging toward the periphery of the box.

16. An outlet or junction box having socket members provided with walls having opposed channels forming spaces wider than the spaces between the corresponding walls, combined with conduits having projecting portions entering said channels.

17. An outlet or junction box having socket members provided with walls having opposed channels that converge in angular lines toward the periphery of the box, combined with conduits having projections flaring in angular lines toward the box and received in said channels.

18. An outlet or junction box having socket members provided with side walls having channels and open portions at the inner parts of said members, combined with conduits having projections entering said channels, and a cover for the box having breakable flanges to close said openings.

19. An outlet or junction box having socket members provided with side walls having channels and open portions at the inner parts of said members, combined with conduits having projections entering said channels, and a cover for the box having breakable flanges to close said openings, said cover also having lugs projecting toward the socket members.

20. An outlet or junction box having socket members, provided with walls having channels that converge toward the periphery of the box, said members having open portions to communicate with the interior of the box, combined with conduits having projecting flared portions entering said channels, breakable closures for the openings from said members into the box, and a cover for the box.

21. An outlet or junction box having socket members provided with walls having channels that converge toward the periphery of the box, said members having open portions to communicate with the interior of the box, combined with conduits having projecting flared portions entering said channels, and a cover having breakable flanges to close the openings from said members into the box.

22. An outlet or junction box having socket members provided with walls having channels that converge toward the periphery of the box, said members having open portions to communicate with the interior of the box, combined with conduits having projecting flared portions entering said channels, and a cover having breakable flanges to close the openings from said members into the box, said cover also having inwardly extending lugs.

GEO. A. LUTZ.
CLARENCE C. SIBLEY.

Witnesses:
FRANK RYALL,
T. F. BOURNE.

It is hereby certified that in Letters Patent No. 929,097, granted July 27, 1909, upon the application of George A. Lutz, of New York, N. Y., and Clarence C. Sibley, of Perth Amboy, New Jersey, for an improvement in "Outlet or Junction Boxes," an error appears in the printed specification requiring correction, as follows: In line 115, page 2, the word "or" should read *on;* and that the said Letters Patent should be read with this correction therein that the same may conform to the record of the case in the Patent Office.

Signed and sealed this 5th day of October, A. D., 1909.

[SEAL.]
C. C. BILLINGS,
*Acting Commissioner of Patents.*